United States Patent
Horikawa

(10) Patent No.: US 7,643,940 B2
(45) Date of Patent: Jan. 5, 2010

(54) OBSTACLE DETECTING APPARATUS

(75) Inventor: Kenichiro Horikawa, Inasa-gun (JP)

(73) Assignee: DENSO CORPORATION, Kariya (JP)

( * ) Notice: Subject to any disclaimer, the term of this patent is extended or adjusted under 35 U.S.C. 154(b) by 767 days.

(21) Appl. No.: 11/178,382

(22) Filed: Jul. 12, 2005

(65) Prior Publication Data

US 2006/0031016 A1  Feb. 9, 2006

(30) Foreign Application Priority Data

Jul. 20, 2004  (JP) .............................. 2004-211758

(51) Int. Cl.
G08G 1/16 (2006.01)
B60Q 1/00 (2006.01)
(52) U.S. Cl. ...................... 701/301; 340/435
(58) Field of Classification Search .................. 701/301; 340/436, 435

See application file for complete search history.

(56) References Cited

U.S. PATENT DOCUMENTS

| | | | |
|---|---|---|---|
| 6,100,796 A | 8/2000 | Wagner et al. | |
| 6,252,520 B1 * | 6/2001 | Asami et al. | 340/903 |
| 6,437,688 B1 * | 8/2002 | Kobayashi | 340/435 |
| 6,721,659 B2 * | 4/2004 | Stopczynski | 701/301 |
| 2001/0037165 A1 * | 11/2001 | Shirai et al. | 701/1 |
| 2002/0003489 A1 * | 1/2002 | Samukawa et al. | 342/70 |
| 2002/0049933 A1 * | 4/2002 | Nyu | 714/43 |
| 2003/0034883 A1 * | 2/2003 | Sato et al. | 340/435 |
| 2005/0034015 A1 * | 2/2005 | Hashimoto et al. | 714/18 |

FOREIGN PATENT DOCUMENTS

| | | |
|---|---|---|
| JP | A-S61-083978 | 4/1986 |
| JP | A-6-3437 | 1/1994 |
| JP | A-2002-026908 | 1/2002 |
| JP | A-2003-270345 | 9/2003 |
| JP | A-2003-279651 | 10/2003 |

OTHER PUBLICATIONS

Search Report and Opinion dated Mar. 20, 2008 in corresponding French Patent Application No. 0507621000 (and English translation).
First Office Action dated Aug. 24, 2007 in corresponding Chinese Patent Application No. 200510086011.7 (and English Translation).
Office Action dated Aug. 26, 2008 in corresponding Japanese Patent Application No. 2004-211758 (and English Translation).

* cited by examiner

*Primary Examiner*—Mark Hellner
*Assistant Examiner*—Helal A Algahaim
(74) *Attorney, Agent, or Firm*—Posz Law Group, PLC

(57) ABSTRACT

An obstacle detecting apparatus includes sensors and a control device. The sensors detect an obstacle and are connected to the control device through a bus. The control device includes communication error determination and detection means. The communication error determination means determines an occurrence of a communication error if communication with the sensors is impossible for a preset error determination time period. The communication error detection means detects the communication error. The communication error determination means sets in advance, as the error determination time period, a preset first error determination time period in the case of the first communication with the sensors and a preset second error determination time period in the case of communication with the sensors after the first communication with the sensors is normally performed. The first error determination time period and the second error determination time period are set so as to be different.

7 Claims, 3 Drawing Sheets

ID SETTING COMMAND FRAME

| HEADER | MESSAGE CATEGORY | SENSOR ID | CHECK SUM |

POLLING FRAME

| RESULT OF DETECTION | . . . | CHECK SUM |

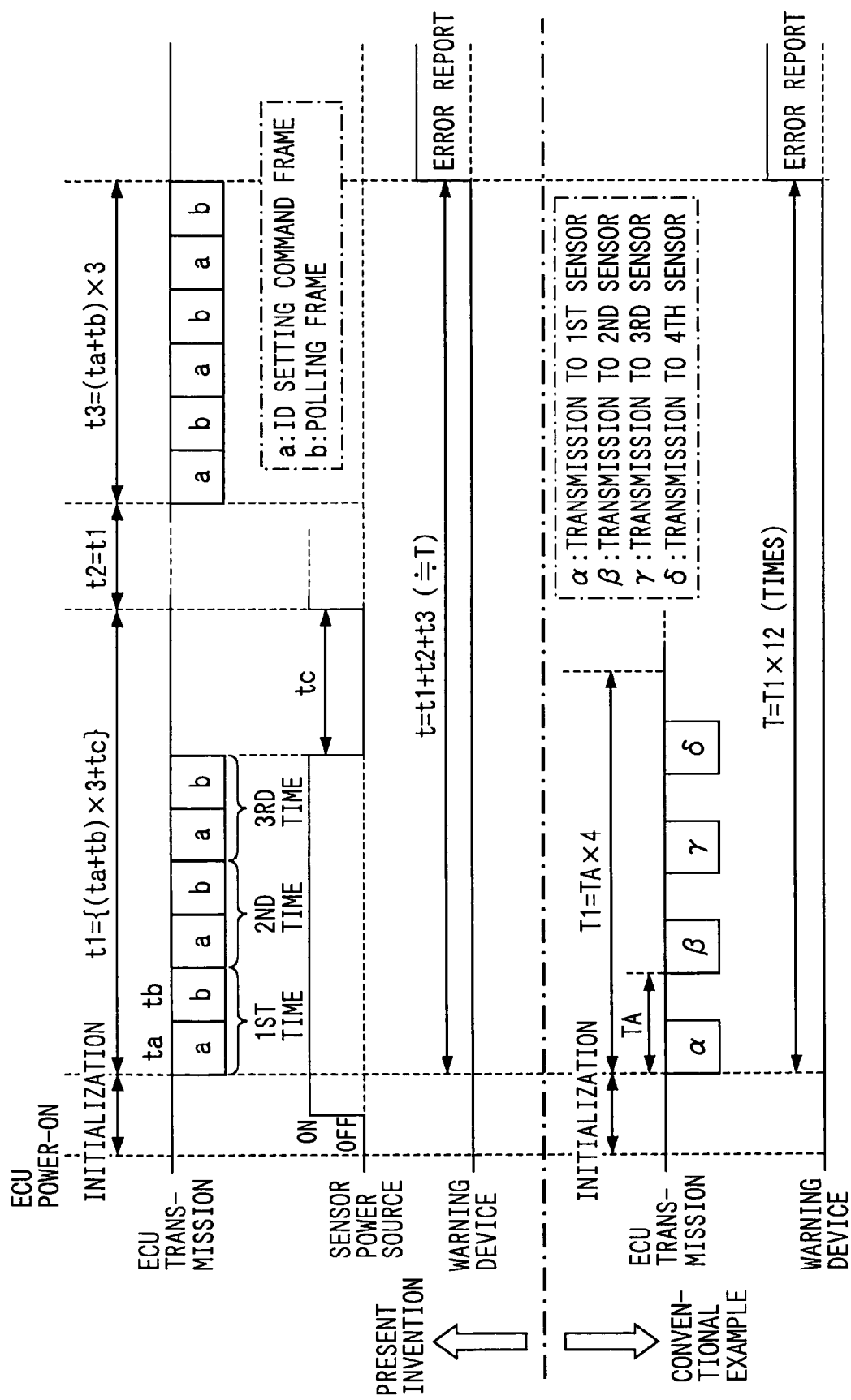

OBSTACLE DETECTING APPARATUS

CROSS REFERENCE TO RELATED APPLICATIONS

This application is based upon and claims the benefit of priority of Japanese Patent Application No. 2004-211758, filed on Jul. 20, 2004, the contents of which are incorporated herein by reference.

FIELD OF THE INVENTION

The present invention relates to an obstacle detecting apparatus.

BACKGROUND OF THE INVENTION

Conventionally, an obstacle detecting apparatus includes a plurality of ultrasonic sensors. In such an obstacle detecting apparatus, an ECU is connected to the sensors through signal lines extending from the ECU in a star topology. However, with a demand for further increasing the number of sensors, it becomes difficult to provide signal lines in a star topology for the reason of space, weight and the like.

In order to cope with the above problem, an obstacle detecting apparatus for the purpose of reducing the number of lines has been proposed in Japanese Patent Laid-Open Publication No. 2003-279651. According to the obstacle detecting apparatus disclosed in this publication, a plurality of sensors and an ECU are connected to each other through a communication line provided in a bus topology. Through the thus provided communication line, intercommunication therebetween is achieved.

In the case where a communication error occurs, the obstacle detecting apparatus using the communication lines as described above generally notifies a user of the occurrence of a communication error as quickly as possible. If the occurrence of such a communication error is to be detected, for example, the following method is generally used. According to this method, error determination time for determining the occurrence of an error is set. The occurrence of a communication error is determined in the case where the communication is impossible for the error determination time or longer, thereby detecting the communication error.

If the error determination time is long, however, the occurrence of a communication error cannot be reported as quickly as possible because the communication error cannot be detected at the early stage. On the other hand, if the error determination time is short, a communication error is detected even if a state gets back to normal immediately after the occurrence of a temporary error. Therefore, the occurrence of an error is erroneously reported.

SUMMARY OF THE INVENTION

Embodiments of the present invention were devised in view of the above-described and other problems, and provide an obstacle detecting apparatus capable of reporting the occurrence of an error as quickly as possible with a reduced number of erroneous reports of the occurrence of an error.

A first aspect of the present invention an obstacle detecting apparatus includes a plurality of sensors and a control device. The plurality o sensors are for detecting an obstacle and are connected to the control device through a bus. The control device includes communication error determination means for determining the occurrence of a communication error if communication with any of the sensors is impossible for a preset error determination time period or longer. The control device further includes communication error detection means for detecting the communication error if the occurrence of the communication error is determined by the communication error determination means.

In this configuration, the communication error determination means sets in advance, as the error determination time period, a preset first error determination time period in the case of the first communication with the plurality of sensors and a preset second error determination time period in the case of communication with the plurality of sensors after the first communication with the plurality of sensors is normally performed, and the first error determination time period and the second error determination time period are set so as to be different from each other.

As described above, in this embodiment of the present invention, the error determination time period (the first error determination time period) in the case where the control device first communicates with the plurality of sensors and the error determination time period after the communication is normally performed (the second error determination time period) are set so as to be different from each other.

As a result, for example, according to a second aspect of the invention, the first error determination time period is set so as to be shorter than the second error determination time period, thereby quickly detecting the communication error at the start of the first communication (upon activation).

If the second error determination time period is set longer than the first error determination time period, the communication error cannot be detected even when a temporary communication error occurs (for example, intermittent noise or the like is generated) after the first communication is normally performed (after activation).

In the obstacle detecting apparatus according to a third aspect of the present invention, the communication error determination means determines the occurrence of the communication error if communication is impossible with at least one of the plurality of sensors. As a result, if the communication is impossible with at least one sensor, the occurrence of the communication error can be determined.

According to a fourth aspect of the invention, the obstacle detecting apparatus comprises warning means for warning of the occurrence of the communication error when the communication error is detected by the communication error detection means. As a result, the obstacle detecting apparatus can warn a user of the occurrence of the communication error.

In the obstacle detecting apparatus according to a fifth aspect of the invention, the plurality of sensors are provided in at least one of a front bumper and a rear bumper of a vehicle so as to detect an obstacle present in the vicinity of the vehicle. As a result, an obstacle present in the vicinity of the vehicle can be detected.

Other features and advantages of the present invention will be appreciated, as well as methods of operation and the function of the related parts from a study of the following detailed description, appended claims, and drawings, all of which form a part of this application. In the drawings:

BRIEF DESCRIPTION OF THE DRAWINGS

FIG. 4 is a timing chart illustrating an error detection process when an ECU performs a first communication according to an embodiment of the present invention and a conventional example.

DETAILED DESCRIPTION OF THE PREFERRED EMBODIMENT

Hereinafter, an embodiment, to which the present invention is applied, will be described with reference to the accompanying drawings. It should be appreciated that the present invention is not limited to the embodiment disclosed herein. It is apparent that various modes are possible as long as they do not depart from the technical scope and spirit of the present invention.

Figures 1, 2A, 2B:
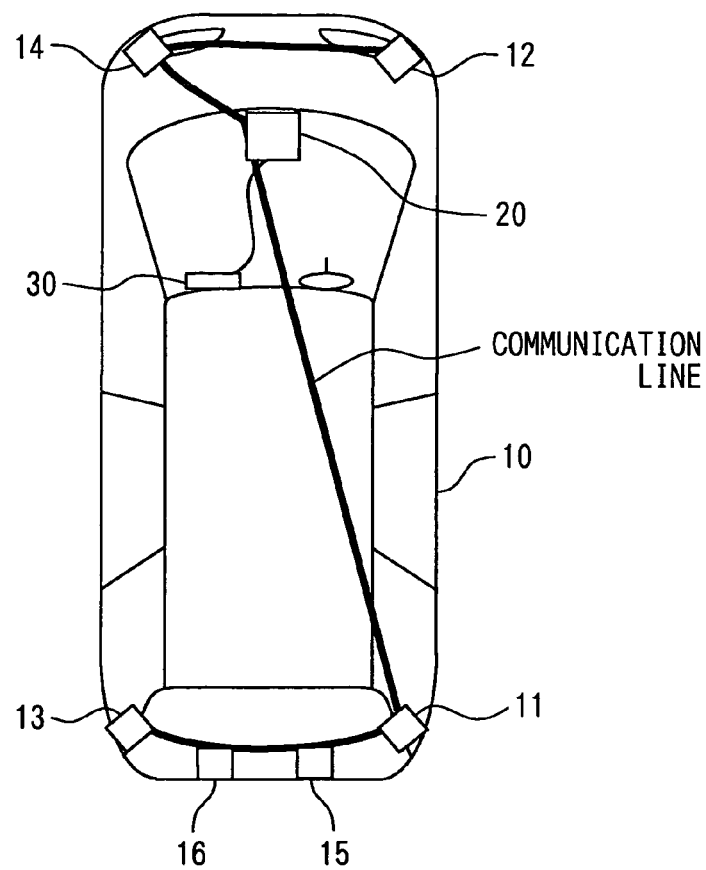
FIG. 1 is a top view of an obstacle detecting apparatus according to an embodiment of the present invention installed in a vehicle.
FIG. 2A is a schematic diagram of a format of an ID setting command frame according to an embodiment of the present invention.
FIG. 2B is a schematic diagram of a format of a polling frame according to an embodiment of the present invention.

FIG. 1 is a top view of an obstacle detecting apparatus according to the present embodiment of the present invention installed in a vehicle 10. The obstacle detecting apparatus is used for notifying a passenger such as a driver of the presence of an obstacle in front of or behind the vehicle 10 and a distance between the obstacle and the vehicle 10.

The obstacle detecting apparatus includes sensors 11 to 16, an ECU 20 serving as a control device, and a warning device 30. The sensors 11 to 16 and the ECU 20 are connected to each other through a communication line provided in a bus topology. The sensors 11 to 16 and the ECU 20 communicate with each other through transmission and reception of a communication frame.

Each of the sensors 11 to 16 is an ultrasonic sensor provided in a front bumper and/or a rear bumper of the vehicle 10 and is used to detect an obstacle present in front of or behind the vehicle 10. Each of the sensors 11 to 16 includes a transmission section for transmitting an ultrasonic wave, a receiving section for receiving a reflected wave of the ultrasonic wave, and a control circuit for measuring a distance to an obstacle based on time required for the ultrasonic wave to strike against the obstacle to be reflected back to the sensor as well as for performing communication with the ECU 20.

Each of the sensors 11 to 16 receives an ID setting command frame shown in FIG. 2A from the ECU 20. Each of the sensors 11 to 16 becomes operational by setting a sensor ID contained in the received ID setting command frame as its own ID.

After setting the sensor ID, each of the sensors 11 to 16 transmits a polling frame shown in FIG. 2B to the ECU 20. The result of measurement by the sensor is assigned to a detection result field contained in the polling frame.

The ECU 20 transmits and receives a communication frame to and from each of the sensors 11 to 16. At the same time, the ECU 20 recognizes a position and a distance of the obstacle based on the polling frame received from each of the sensors 11 to 16. The ECU 20 is also connected to external sensors. As the external sensors, a vehicle speed sensor and a shift position sensor, both not shown, are provided.

The ECU 20 includes a non-volatile memory not shown. A sensor ID in accordance with the location of installation of each of the sensors 11 to 16 and the like are written to the non-volatile memory. When powered ON, the ECU 20 sequentially transmits the ID setting command frames shown in FIG. 2A to the sensors 11 to 16 in the order of proximity to the ECU 20. Then, the ECU 20 receives the polling frame shown in FIG. 2B from the sensor with the sensor ID being normally set.

The warning device 30 includes an image display device having a liquid crystal display and a sound output device. The image display device displays the position of the obstacle recognized by the ECU 20 in real time. The sound output device outputs a sound in accordance with the distance to the obstacle, recognized by the ECU 20.

In a communication error determination process described below, the warning device 30 warns of the occurrence of a communication error through the above-mentioned image display device or sound output device so as to notify a vehicle driver of the occurrence of the communication error.

Figure 3:
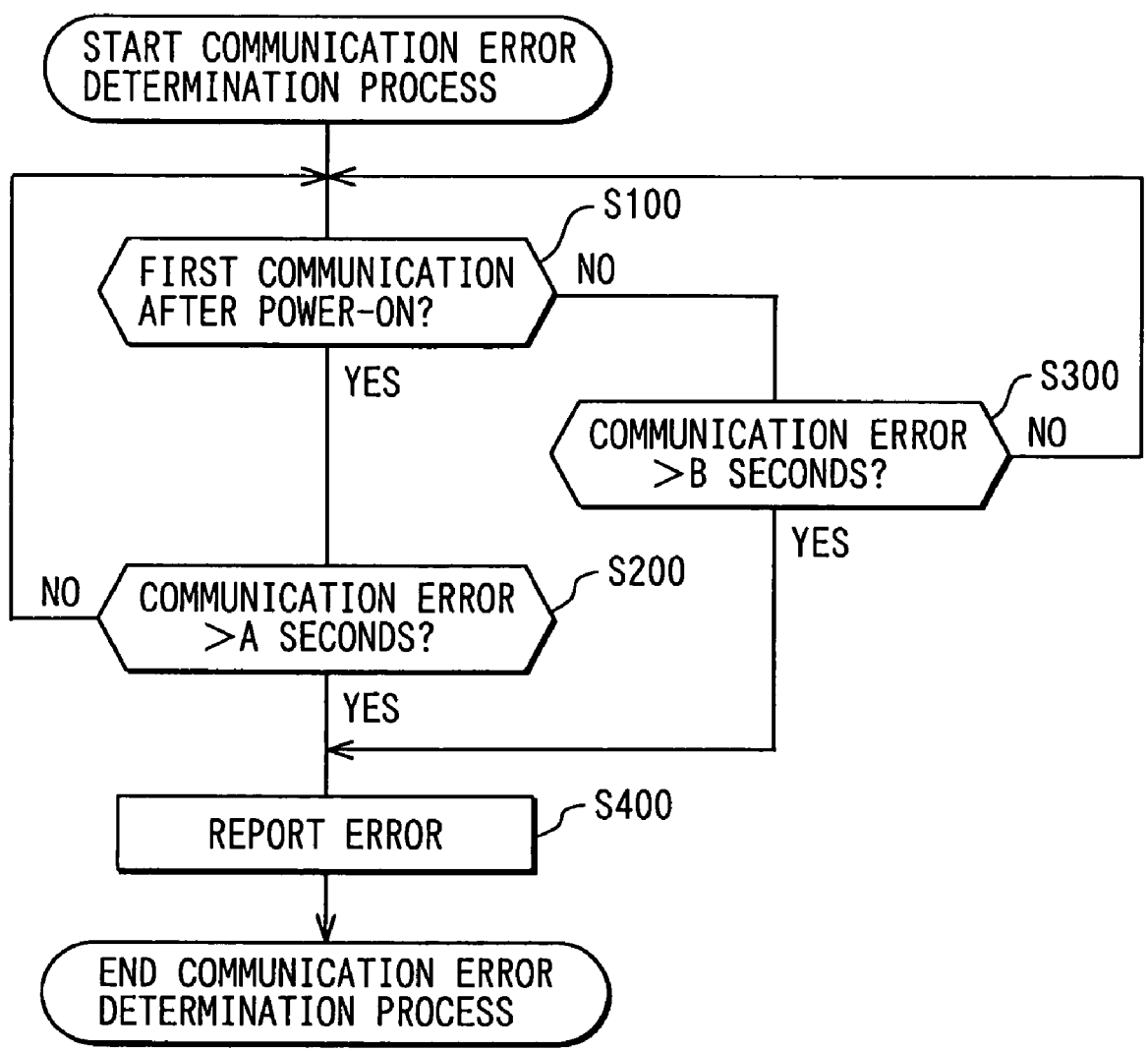
FIG. 3 is a flowchart of a communication error determination process according to an embodiment of the present invention.

The ECU 20 in the thus configured obstacle detecting apparatus according to this embodiment executes a communication error determination process for detecting the occurrence of a communication error with the sensors 11 to 16. The communication error determination process will now be described with reference to the flowchart of FIG. 3. The communication error determination process is started by powering the ECU 20 ON.

First, after the ECU 20 is powered ON, it is determined at Step (hereinafter, abbreviated as S) 100 whether or not it is the first communication (in the case where communication is started for the first time) with the sensors 11 to 17 after power-ON. If it is determined "YES," the process proceeds to S200. On the other hand, if it is determined "NO," the process proceeds to S300.

At S200, it is determined whether or not there is any sensor among the sensors 11 to 16, with which communication is impossible for A seconds or longer. If it is determined "YES," the occurrence of communication error is reported at S400. On the other hand, if it is determined "NO," the process returns to S100. As a result, it can be determined that the communication error occurs at the start of the first communication (upon activation).

If it is determined at S100 that it is not the first communication with the sensors 11 to 16, it is then determined at S300 whether or not there is any sensor, with which communication is impossible for B seconds or longer. If it is determined "YES," the occurrence of communication error is reported at S400. On the other hand, if it is determined "NO," the process returns to S100. As a result, it can be determined that the communication error occurs after the first communication is normally performed.

Error determination time periods (A and B) at S200 and S300 in the above-described communication error determination process are set so as to be different from each other. The error determination time period (A) in the case of the first communication with the sensors 11 to 16 is set so as to be shorter than the error determination time period (B) in the case where the communication is performed after the first communication is normally performed (A<B).

As a result, the communication error at the start of the first communication with the sensors 11 to 16 (upon activation) can be quickly detected. Moreover, in the case where a temporary error occurs (for example, intermittent noise or the like is generated) after the first communication with the sensors 11 to 16 is normally performed (after activation), the communication error is not detected. As a result, the number of erroneous reports of the occurrence of an error is reduced while the occurrence of an error can be reported as quickly as possible.

FIG. 4 is a timing chart showing an example where an error is detected when the ECU performs the first communication in the obstacle detecting apparatus according to the embodiment of the present invention and a conventional example where an error is detected when the ECU performs the first communication in the conventional obstacle detecting apparatus. In the conventional obstacle detecting apparatus, four sensors and an ECU are connected to each other through signal lines extending in a star topology. As shown in FIG. 4, it is assumed that time required from power-ON of the ECU to the end of initialization is approximately the same in the conventional example and the embodiment of the present invention.

In the conventional example, after initialization is completed, the ECU successively transmits measurement command signals ($\alpha$, $\beta$, $\gamma$, and $\delta$) to the respective sensors and then waits for a response indicating the result of measurement. Assuming that a time period from the transmission of the measurement command signals to the end of a response waiting state for the result of measurement is TA, a total length of time required for the transmission to all the sensors until the end of the final response waiting state is T1 (=TA×4).

In the conventional example, if no response indicating the result of measurement is returned from any of the sensors during T1, the measurement command signals ($\alpha$, $\beta$, $\gamma$, and $\delta$) are transmitted for 12 times. If there is a sensor, from which no response indicating the result of measurement is returned during the transmission, a communication error is reported. Herein, it is assumed that a time period from the completion of initialization to the error report is T (=T1×12).

On the other hand, in the case of the obstacle detecting apparatus according to the embodiment of the present invention, during initialization, electric power is supplied to the sensor closest to the ECU 20. When the closest sensor is powered ON, the obstacle detecting apparatus transmits the ID setting command frame (a) to the sensor and then waits for the polling frame (b) to be returned. Herein, a time period (ta) indicates transmission time of the ID setting command frame (a), whereas a time period (tb) indicates waiting time for the polling frame (b) to be returned in response.

If the polling frame (b) is not returned from the sensor, the ECU 20 transmits the ID setting command frame (a) again to the sensor to wait for the polling frame (b) to be returned in response. If the polling frame (b) is still not returned, the ECU 20 transmits the ID setting command frame (a) once again to the sensor to wait for the polling frame (b) to be returned in response.

If the polling frame is still not sent back even after the transmission of the ID setting command frame (a) and the waiting state for the polling frame (b) to be returned are repeated for three times as described above, the sensor is powered OFF. After a predetermined time period (tc), the sensor is powered ON again so that the ECU 20 transmits the ID setting command frame (a) again and waits for the polling frame (b) to be returned.

Herein, it is assumed that a time period required for repeating the transmission of the ID setting command frame (a) and the waiting state for the polling frame (b) to be returned for three times and powering the sensor OFF and ON again is (t1).

The obstacle detecting apparatus according to the embodiment of the present invention reports an error only after the following procedure. After repeating the transmission of the ID setting command frame (a) and the waiting state for the polling frame (b) to be returned for three times, the process of powering the sensor OFF and ON again is repeated twice. Thereafter, the transmission of the ID setting command frame (a) and the waiting state for the polling frame (b) are repeated again for three times. If the polling frame is not still returned after the above process, an error is reported.

A time period until the report of an error is (t=t1+t2+t3) after the completion of initialization. The above-described error detection time period (A) is preset based on the time period (t). If the time period (t) is set so as to be approximately the same as the time period until the report of an error in the conventional example (t≈T), the communication error can be reported as quickly as in the conventional example after the start of the first communication.

What is claimed is:

1. An obstacle detecting apparatus comprising:
    a warning device:
    a plurality of sensors for detecting an obstacle; and
    a control device to which the plurality of sensors are connected through a bus, wherein the control device is coupled to the warning device, the control device including
        communication error determination means for determining an occurrence of a communication error if communication with any of the sensors is impossible for a preset error determination time period or longer, and
        communication error detection means for detecting the communication error if the occurrence of the communication error is determined by the communication error determination means to be impossible, wherein
    the warning device is activated if the communication error determination means determines that the communication with any of the sensors is impossible,
    the communication error determination means sets in advance, as the error determination time period, a preset first error determination time period in the case of the first communication with the plurality of sensors and a preset second error determination time period in the case of communication with the plurality of sensors after the first communication with the plurality of sensors is normally performed,
    the first error determination time period and the second error determination time period are set so as to be different from each other, and
    the first error determination time period is set by the communication error determination means to be shorter than the second error determination time period.

2. The obstacle detecting apparatus according to claim 1, wherein the communication error determination means determines the occurrence of the communication error if communication is impossible with at least one of the plurality of sensors.

3. The obstacle detecting apparatus according to claim 1, wherein the plurality of sensors is provided in at least one of a front bumper and a rear bumper of a vehicle so as to detect an obstacle present in the vicinity of the vehicle.

4. An obstacle detecting apparatus for accurately detecting and reporting a communication error, the obstacle detecting apparatus having a control device, a warning device, and a plurality of sensors connected to the control device through a bus, wherein the plurality of sensors and the control device are capable of communicating across the bus through transmission and reception of a communication frame, and wherein the control device is configured to:
    attempt to conduct an initial communication with each of the plurality of sensors including a respective initial transmission of the communication frame to each of the plurality of sensors and a respective response frame from the each of the plurality of sensors;
    determine whether the initial communication is a first communication with each of the plurality of sensors since a power on operation associated with the obstacle detecting apparatus and whether communication with one or more of the plurality of sensors is impossible;

institute a first error remediation procedure associated with a first time period if the communication with the one or more of the plurality of sensors is impossible and if the initial communication is the first communication;

institute a second error remediation procedure associated with a second time period, which is longer than the first time period, if the communication with the one or more of the plurality of sensors is impossible and if the initial communication is not the first communication, wherein if one of the first remediation procedure and the second remediation procedure is unsuccessful, the warning device is activated to provide a warning of the communication error.

5. The obstacle detecting apparatus according to claim 4, wherein: the initial communication includes a first ID setting command frame transmitted by the control device to the each and a polling frame transmitted from each of the plurality of sensors to the control device in response to the first ID setting command frame; the control device in conducting the first error remediation procedure is further configured to:

(a) transmit up to two additional ID setting frames if the communication is determined to be impossible based on a failure to receive the polling frame from each of the plurality of sensors within the first time period in response to the up to two additional ID setting frames;

(b) power OFF the each if the polling frame is not received in response to the up to two additional ID setting frames within the first time period and subsequently power ON the each and perform (a) again; and (c) report the communication error using the warning device if, after performing (b) up to two times, communication is determined to be impossible.

6. The obstacle detecting apparatus according to claim 4, wherein the initial communication includes a first ID setting command frame transmitted by the control device to each of the sensors and a polling frame transmitted from each of the sensors to the control device in response to the first ID setting command frame, and the control device in conducting the second error remediation procedure is further configured to:

(a) transmit up to two additional ID setting frames if the communication is determined to be impossible based on a failure to receive the polling frame from each of the sensors within the second time period in response to the up to two additional ID setting frames;

(b) power OFF the sensors if the polling frame is not received in response to the up to two additional ID setting frames within the second time period and subsequently power ON the sensors and perform (a) again; and (c) report the communication error using the warning device if, after performing (b) up to two times, communication is determined to be impossible.

7. The obstacle detecting apparatus according to claim 4, wherein the sensors are provided in at least one of a front bumper and a rear bumper of a vehicle to detect an obstacle present in the vicinity oft. vehicle.

* * * * *